US007932644B2

(12) United States Patent
Poyner et al.

(10) Patent No.: US 7,932,644 B2
(45) Date of Patent: Apr. 26, 2011

(54) SAFETY SWITCH

(75) Inventors: Julian Poyner, Stockport (GB); Derek Sawyer, Granada (ES)

(73) Assignee: Rockwell Automation Limited, Milton Keynes (GB)

( * ) Notice: Subject to any disclaimer, the term of this patent is extended or adjusted under 35 U.S.C. 154(b) by 851 days.

(21) Appl. No.: 11/769,806

(22) Filed: Jun. 28, 2007

(65) Prior Publication Data

US 2008/0074214 A1 Mar. 27, 2008

(30) Foreign Application Priority Data

Sep. 22, 2006 (GB) .................................. 0618666.2

(51) Int. Cl.
*H02H 11/00* (2006.01)

(52) U.S. Cl. ......................... 307/326; 307/328; 361/179

(58) Field of Classification Search .................. 307/326, 307/328; 361/179
See application file for complete search history.

(56) References Cited

U.S. PATENT DOCUMENTS

| | | | | | |
|---|---|---|---|---|---|
| 2,264,746 | A | * | 12/1941 | Ellwood | 335/154 |
| 3,317,869 | A | * | 5/1967 | Funke | 335/154 |
| 3,348,175 | A | * | 10/1967 | Wilkis | 335/154 |
| 3,359,463 | A | * | 12/1967 | Jones, Jr. | 361/142 |
| 5,134,375 | A | * | 7/1992 | Fuchi | 324/419 |
| 5,151,840 | A | * | 9/1992 | Siefken | 361/13 |

* cited by examiner

*Primary Examiner* — Hal I. Kaplan
(74) *Attorney, Agent, or Firm* — Boyle Fredrickson LLP; William R. Walbrun; John M. Miller

(57) ABSTRACT

A safety switch configured to determine whether a magnetically operated switch which forms part of the safety switch has been welded closed. The safety switch is configured to establish a first magnetic field in the vicinity of the magnetically operated switch. The magnetic field is arranged to move the magnetically operated switch from a first configuration to a second configuration. The safety switch monitors the state of the magnetically operated switch to determine if the magnetically operated switch has been moved by the first magnetic field, thereby determining if the magnetically operated switch has been welded closed.

27 Claims, 9 Drawing Sheets

SAFETY SWITCH

CROSS-REFERENCE TO RELATED APPLICATION

This application claims priority under 35 U.S.C. §119 to United Kingdom Patent Application No. 0618666.2 filed on Sep. 22, 2006, the entirety of which is incorporated by reference herein.

BACKGROUND OF THE INVENTION

The present invention relates to safety switches.

A safety switch may be considered as an emergency electrical shut off switch, and either allows or prevents electricity from passing through it (i.e. it provides a closed circuit or an open circuit). If the safety switch is 'open', such that it forms an open circuit, electricity will not pass to an apparatus to which the safety switch is connected.

Safety switches are often used in places where access to machinery is restricted by machine guards which surround the machinery. For example, safety switches are often found in factories that use kinetic machinery powered by electricity. The safety switch may be used to prevent access to a machine via a machine guard when the machinery is in operation. Specifically, power will only be supplied to the machinery when the safety switch is 'closed' (i.e. forming a closed circuit), and this is conveniently achieved by the closure of a gate or door incorporated in the machine guard. When the gate is opened, the safety switch is also opened, causing a break in the circuit which prevents electricity being supplied to the machinery (i.e. the machinery cannot run when the gate is opened). Safety switches are well known in the art, and come in a variety of different forms.

One type of safety switch that is used to control access to a machine via a machine guard (or other enclosure) incorporates a reed switch. An electric circuit comprising a reed switch is located, for example, in a fence post of the machine guard. The reed switch is biased to an open position by, for example, a spring. When the reed switch is open there is an open circuit, which prevents electricity being supplied to machinery within the machine guard. A magnet is provided on a door to the machine guard and is positioned such that, when the door to the machine guard is closed, the magnet is adjacent to and in close proximity with the reed switch. Closure of the door brings the magnet into proximity with the reed switch, which causes the reed switch to close. When the reed switch closes, electricity may be supplied to the machinery within the machine guard. If the door is open, the magnet is no longer in close proximity with the reed switch, and the bias applied to the reed switch causes it to open, forming an open circuit. Electricity is then no longer supplied to the machinery.

Many safety switches incorporate reed switches. However, reed switches have a number of disadvantages. For example, the reed switch may become welded closed due to the large amount of current flowing through the reed switch. When the reed switch is welded closed, electricity may be supplied to machinery within the machine guard whether or not the door to the machine guard is open or closed. Thus if the reed switch welds closed, a user may enter the machine guard when the machinery is operating, which is contrary to the purpose of the safety switch.

As described above, a reed switch is opened and closed by bringing a magnet into close proximity with the reed switch. Thus, with the prior art safety switches which incorporate a reed switch, a user can circumvent the safety switch by placing a magnet adjacent to the reed switch to close the reed switch. By placing a magnet adjacent to the reed switch, the reed switch can be closed and electricity can be supplied to the machinery within the machine guard. A user can apply a magnet to the reed switch without closing the door to the machine guard, which means that a user can enter the machine guard while machinery is operating. Again, the purpose of incorporating a safety switch is to avoid such a scenario.

Although the problem of welding is particularly relevant to reed switches, other magnetically operated switches can also become welded closed.

It is thus desired to obviate or mitigate at least one of the above-mentioned disadvantages.

BRIEF SUMMARY OF THE INVENTION

According to a first aspect of the invention there is provided a method of determining whether a magnetically operated switch which forms part of a safety switch has been welded closed. The method establishes a first magnetic field in the vicinity of the magnetically operated switch such that the magnetic field is arranged to move the magnetically operated switch from a first configuration to a second configuration. The method monitors the state of the magnetically operated switch to determine if the magnetically operated switch has been moved by the first magnetic field and thereby determines if the magnetically operated switch has been welded closed.

Preferably, a first configuration is defined by the magnetically operated switch being closed, and the second configuration is defined by the magnetically operated switch being open.

Preferably, the method also prevents the safety switch from supplying electricity to electrically operated apparatus if, by monitoring the state of the magnetically operated switch, the magnetically operated switch is found to be welded closed.

Preferably, monitoring the state of the magnetically operated switch involves monitoring electrical characteristics of a circuit of which the magnetically operated switch forms a part. Preferably, the electrical characteristics monitored are at least one of the current flowing through the circuit and the potential difference across a component in the circuit.

Preferably, the first magnetic field is established for a period of time which, if the magnetically operated switch is opened by the first magnetic field to break an electric circuit supplying electricity to electrically powered apparatus, is insufficient to affect or significantly affect the supply of electricity to the electrically operated apparatus. Preferably, the first magnetic field is established for less than one second. Preferably, the first magnetic field is established for less than ten milliseconds.

Preferably, the first magnetic field is established by energising an electromagnet.

Preferably, the method is undertaken periodically.

Preferably, the method is repeated to verify the state of the magnetically operated switch.

Preferably, the method further comprises establishing a second magnetic field in the vicinity of the magnetically operated switch to close the magnetically operated switch, before establishing the first magnetic field arranged to open the magnetically operated switch.

Preferably, the magnetically operated switch is attached to part of an enclosure, and the magnet is located in a door of the enclosure such that the magnet is brought into the vicinity of the magnetically operated switch by closing the door of the enclosure. Alternatively, the magnet is attached to part of an enclosure, and the magnetically operated switch is attached to a door of the enclosure such that the magnetically operated switch is brought into the vicinity of the magnet by closing the door of the enclosure.

Preferably, the state of the magnetically operated switch is monitored by monitoring apparatus.

Preferably, the magnetically operated switch is a reed switch.

According to a second aspect of the invention there is provided a safety switch arranged to allow the control of the supply of electricity to electrically powered apparatus. The safety switch includes a magnetically operated switch and an electromagnet located adjacent the magnetically operated switch. The electromagnet is energisable to establish a magnetic field to move the magnetically operated switch from a first configuration to a second configuration. An electromagnet control apparatus is arranged to energise the electromagnet. A monitoring apparatus is configured to monitor the state of the magnetically operated switch and determine whether the magnetically operated switch has moved in response to energization of the electromagnet.

Preferably, the first configuration is defined by the magnetically operated switch being closed, and the second configuration is defined by the magnetically operated switch being open.

Preferably, the monitoring apparatus is arranged to prevent electricity from being supplied to the electrically powered apparatus if the magnetically operated switch does not open in response to the energization of the electromagnet.

Preferably, the control apparatus is arranged to energise the electromagnet for a period of time which, if the magnetically operated switch is opened by the magnetic field to break an electric circuit supplying electricity to the electrically powered apparatus, is insufficient to affect or significantly affect the supply of electricity to the electrically operated apparatus. Preferably, the control apparatus is arranged to energise the electromagnet for less than one second. Preferably, the control apparatus is arranged to energise the electromagnet for less than ten milliseconds.

Preferably, the control apparatus is configured to periodically energise the electromagnet.

Preferably, the monitoring apparatus is a processor.

Preferably, the magnetically operated switch is a reed switch.

According to a third aspect of the invention there is provided a safety switch arranged to allow the control of the supply of electricity to electrically powered apparatus. The safety switch has a magnetically operated control switch and a monitoring apparatus in electrical communication with the magnetically operated control switch. The monitoring apparatus is configured to monitor the state of the magnetically operated control switch and arranged to control the supply of electrical power to electrically powered apparatus depending on the state of the magnetically operated control switch. A magnetically operated override switch is in electrical communication with the monitoring apparatus such that the monitoring apparatus is configured to prevent the supply of electricity to the electrically powered apparatus if the magnetically operated override switch is operated, regardless of the state of the magnetically operated control switch.

Preferably, the safety switch comprises two monitoring apparatus and the magnetically operated override switch is connected between the two monitoring apparatus. Operation of the magnetically operated override switch is arranged to allow or prevent communication between the two monitoring apparatus. Preferably, one or both of the monitoring apparatus are configured to prevent the supply of electricity to the electrically powered apparatus if the magnetically operated override switch is operated. Preferably, the safety switch comprises an additional magnetically operated override switch connected between the two monitoring apparatus, wherein operation of the magnetically operated override switch or the additional magnetically operated override are arranged to allow or prevent communication between the monitoring apparatus. Preferably, one or both of the monitoring apparatus are configured to prevent the supply of electricity to the electrically powered apparatus if the magnetically operated override switch or the additional magnetically operated override switch is operated.

Preferably, the monitoring apparatus is configured to prevent the supply of electricity to the electrically powered apparatus if the magnetically operated override switch is opened. Alternatively, the monitoring apparatus is configured to prevent the supply of electricity to the electrically powered apparatus if the magnetically operated override switch is closed.

Preferably, the monitoring apparatus is configured to only allow the supply of electricity to the electrically powered apparatus if the magnetically operated control switch is closed.

Preferably, the monitoring apparatus is a processor.

Preferably, the magnetically operated control switch is a reed switch.

Preferably, the magnetically operated override switch is a reed switch.

BRIEF DESCRIPTION OF THE DRAWINGS

Embodiments of the present invention will now be described, by way of example only, with reference to the accompanying drawings, in which.

The figures are not drawn to scale, and are only schematically shown to aid the understanding of the invention. Identical features shown in different Figures have been given the same reference numerals.

DETAILED DESCRIPTION OF THE INVENTION

Figure 1A:
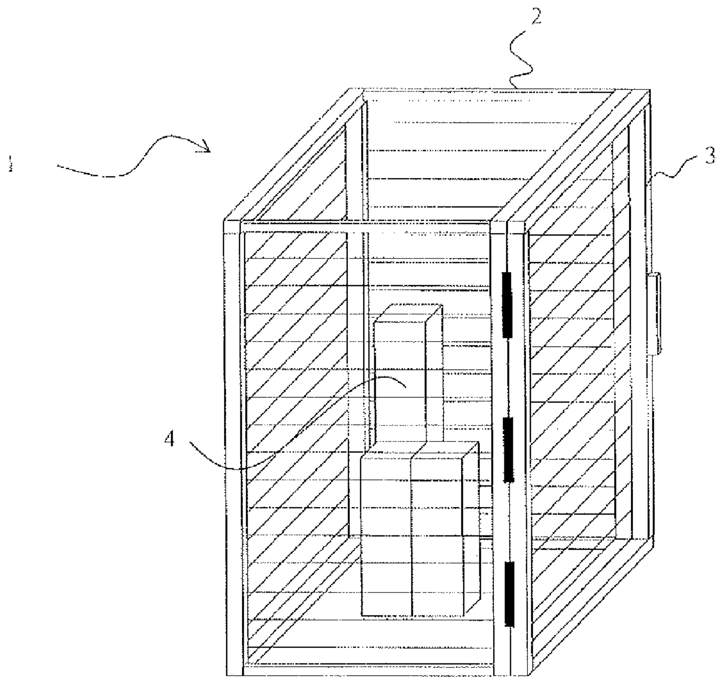
PRIOR ART FIGURE 1A
FIGS. 1*a* to 1*c* depict a machine guard for use with the present invention and a prior art safety switch.

FIG. 1*a* depicts a machine guard 1. The machine guard 1 is provided with a fence 2 and a door 3. Located within the machine guard 1 is electrically operated machinery 4. Access to the electrically operated machinery 4 is gained by opening the door 3 of the machine guard 1. The machine guard 1 is provided with a safety switch, which operates to prevent electricity being supplied to the electrically operated machinery 4 when the door 3 to the machine guard 1 is opened.

Figure 1B:
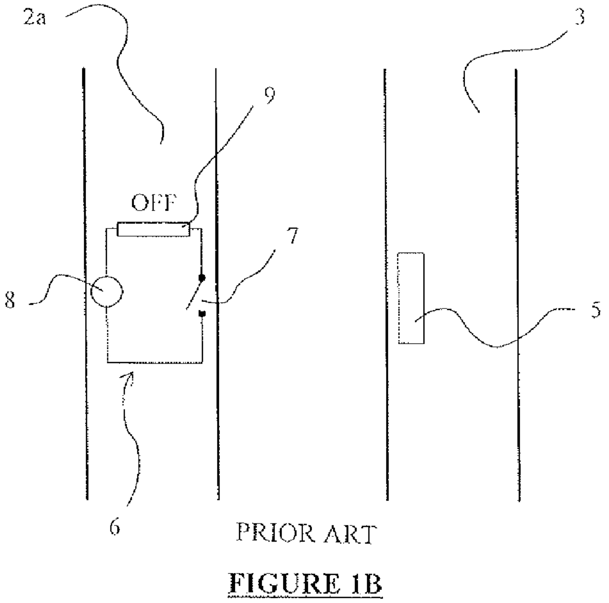
PRIOR ART FIGURE 1B
Figure 1C:
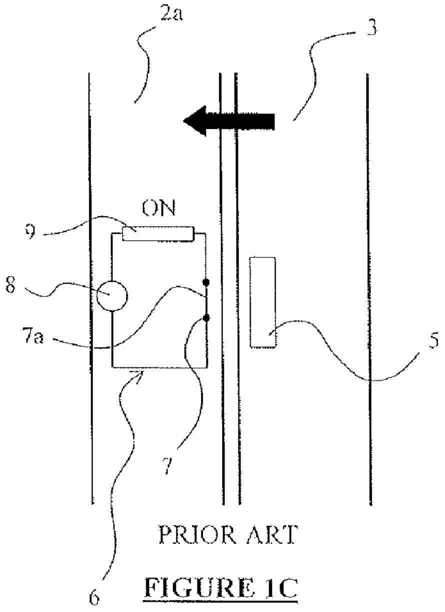
PRIOR ART FIGURE 1C

FIGS. 1*b* and 1*c* depict a prior art safety switch used in the machine guard 1. In the door 3 of the machine guard 1 there is located a magnet 5. An electric circuit 6 is located in a fence post 2*a* of the fence 2 of the machine guard 1. The electric circuit 6 is provided with a reed switch 7 which is connected in series with a power supply 8 and a load 9. The load 9 is shown schematically in FIG. 1*b*, but may be, for example, the electrically operated machinery 4. The reed switch 7 is biased to an open position (e.g. by a spring or other suitable biasing means) so that no electricity can be supplied to the load 9 by the power supply 8 unless the reed switch 7 is closed.

FIG. 1*c* shows how the reed switch 7 may be closed, to allow electricity to be supplied to the load 9. The door 3 is moved towards the fence post 2*a*, which in turn brings the magnet 5 into close proximity with the reed switch 7. When the magnet 5 is in close proximity with the reed switch 7, the reed switch is closed due to an armature 7*a* of the reed switch 7 being magnetically attracted to the magnet 5.

The electric circuit 6 and the reed switch 7 that it incorporates are commonly used as a safety switch in order to control the supply of electricity to the electrically operated machinery 4. However, the circuit 6 is basic and is unable to identify problems with the safety switch. A particular problem is that the armature 7*a* of the reed switch 7 may become welded closed (i.e. the reed switch 7 is welded closed), such that electricity is supplied to the load 9 regardless of whether the door 3 to the machine guard 1 is open or closed. When the armature 7*a* of the reed switch 7 is welded closed, the electrical circuit 6 no longer provides any safety features, i.e. a user can enter the machine guard 1 when the electrically operated machinery is in operation.

Figure 2A:
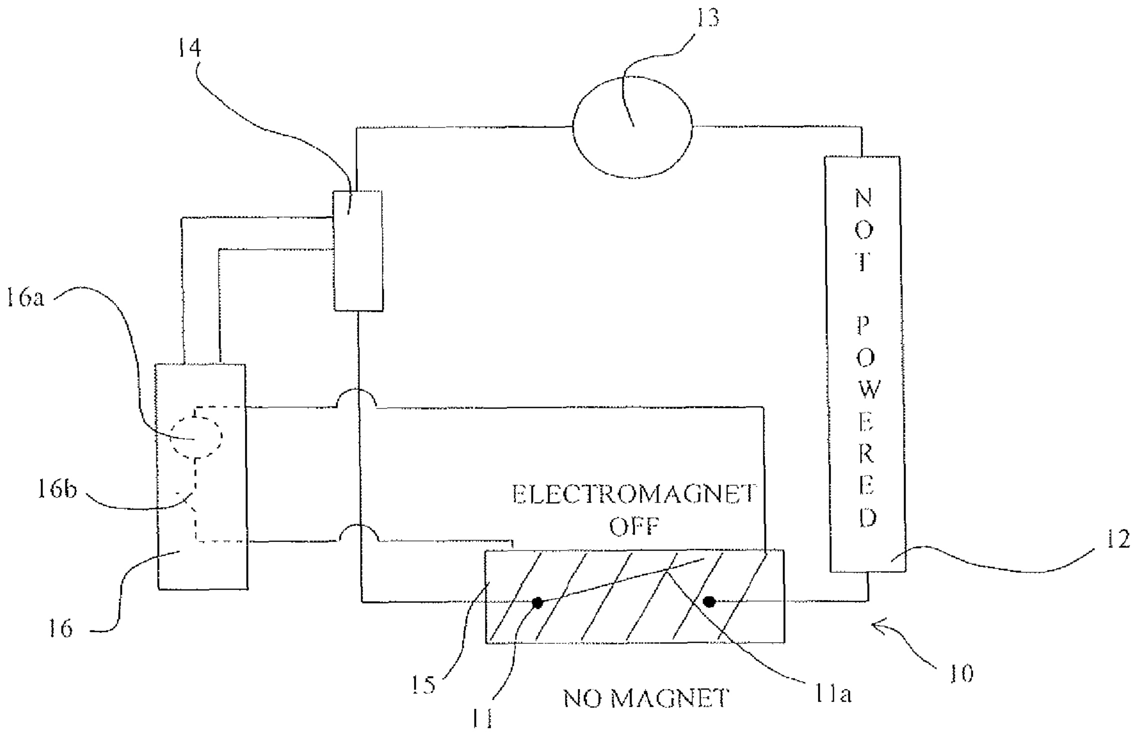
FIGS. 2*a* and 2*b* depict a safety switch according to an embodiment of the present invention.
Figure 2B:
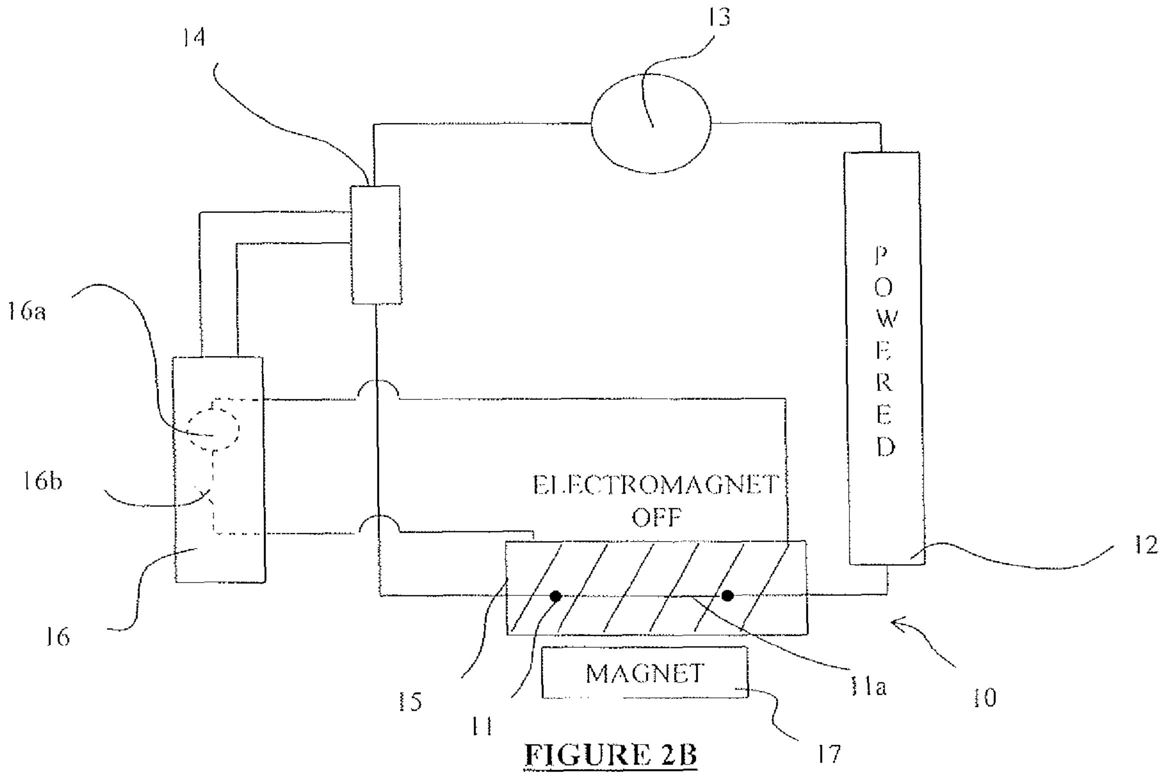

FIGS. 2*a* and 2*b* illustrate a safety switch in accordance with an embodiment of the present invention. The safety switch comprises an electric circuit 10. The electric circuit 10 is provided with a reed switch 11, a power supply 13 and monitoring apparatus 14, all connected in series with one another (although it will be appreciated that any suitable circuit configuration may be used). The electric circuit 10 is connected to a load 12. The reed switch 11 is provided with an armature 11*a* which is biased so that the reed switch 11 is biased to an open position. The armature 11*a* may be biased open by a spring, or any other suitable biasing means. For example, the armature 11*a* may be bent, so that the armature 11*a* itself acts as a spring. When the reed switch 11 is in an open position, no electricity can be supplied to the load 12 (which may be, for example, electrically operated machinery within a machine guard or a circuit supplying the machinery with electricity).

The safety switch is also provided with an electromagnet 15 which surrounds the reed switch 11. The electromagnet 15 is controlled by an electromagnet control apparatus 16. The electromagnet control apparatus 16 is provided with an electromagnet power supply 16*a* and a switch 16*b* for controlling the supply of electricity to the electromagnet 15. The electromagnet 15 is arranged such that when power is supplied to the electromagnet 15, the electromagnet 15 becomes energised and establishes a magnetic field in the vicinity of the reed switch 11. The reed switch 11 can be opened or closed by energising the electromagnet 11 and establishing a magnetic field. Whether the reed switch is opened or closed depends on, amongst other things, the initial configuration of the reed switch 11 and the nature of any other magnetic fields in the vicinity of the reed switch 11 (as described in more detail below).

FIG. 2*a* shows a situation where the reed switch 11 is open. There is no magnetic field present in the vicinity of the reed switch 11 which would act against the biased armature 11*a* of the reed switch 11 and cause it to close. Since the reed switch 11 of FIG. 2*a* is open, no electricity may be supplied to the load 12. FIG. 2*a* can be taken to represent the situation when a door to a machine guard is open.

FIG. 2*b* illustrates the situation when the door to the machine guard to closed. The door is provided with a magnet 17. By closing the door, the magnet 17 is brought into close proximity with the reed switch 11. The magnet 17 attracts the armature 11*a* of the reed switch 11 to a closed position, thus closing the reed switch 11. When the reed switch 11 is closed, electricity may be supplied to the load 12. Thus, FIG. 2*b* illustrates the situation when the door to the machine guard is closed, the door being provided with the magnet 17, thus bringing the magnet 17 in the door into close proximity with the reed switch 11.

Figure 3:
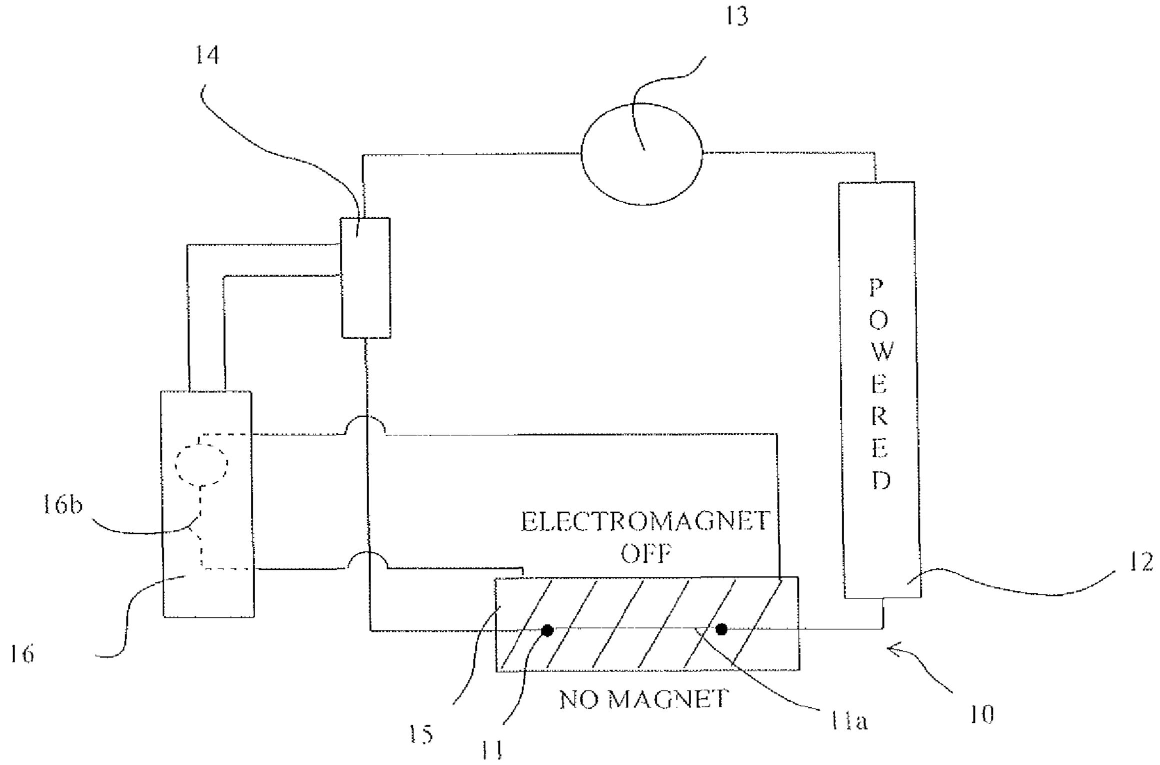
FIG. 3 depicts malfunction of the safety switch of FIGS. 2*a* and 2*b;*

FIG. 3 illustrates the safety switch when the armature 11*a* of the reed switch 11 has welded closed. It can be seen from FIG. 3 that even though the electromagnet is off, and no magnets (e.g. in a door to the machine guard) are in close proximity to the reed switch 11, electricity is nevertheless still supplied to the load 12. Thus, even if the door to the machine guard is opened, electricity may still be supplied to machinery within the machine guard.

Figure 4A:
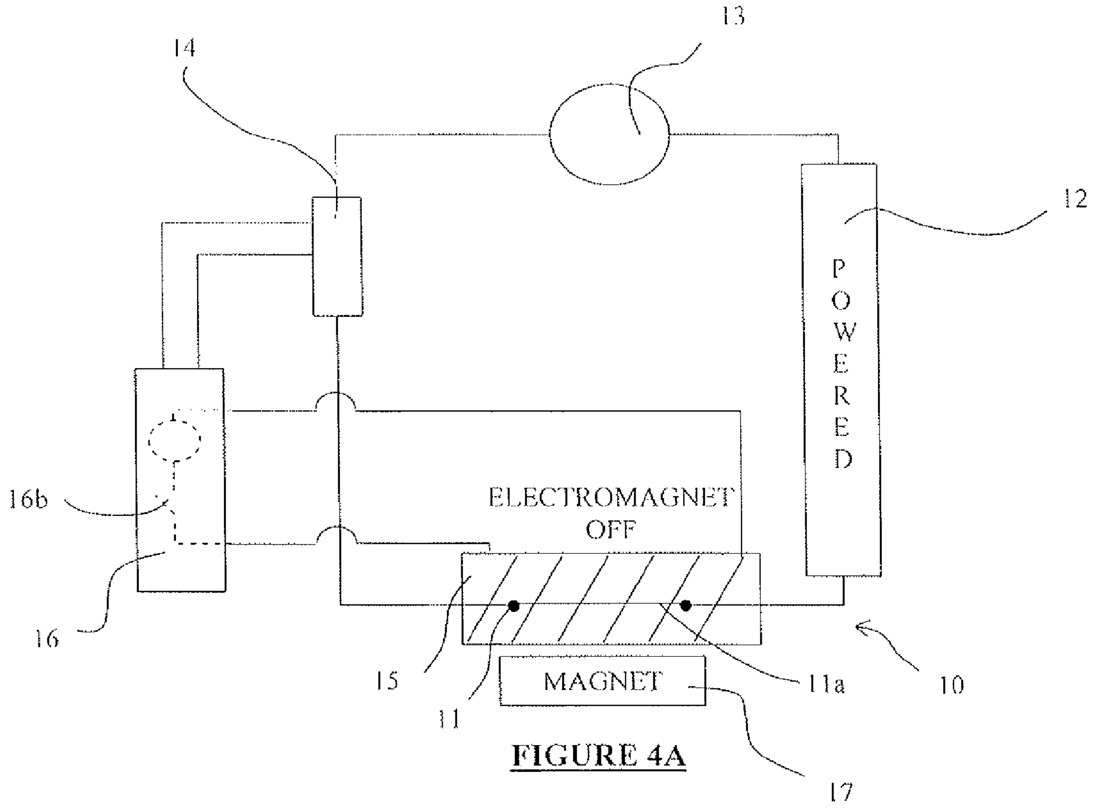
FIGS. 4*a* and 4*b* depict a test for the detection of the malfunction shown in FIG. 3.

FIGS. 4 and 5 illustrate how the electromagnet 15, electromagnet control apparatus 16 and monitoring apparatus 14 can be used to detect whether or not the armature 11*a* of the reed switch 11 has been welded closed (or more generally speaking, whether the reed switch 11 has become welded closed). FIG. 4*a* is identical to FIG. 2*b*, and illustrates the situation where the magnet 17 is in close proximity to the reed switch 11, thereby causing the armature 11*a* to close, allowing electricity to be supplied to the load 12. In order to test whether or not the armature 11*a* of the reed switch 11 has been welded closed, the electromagnet 15 is periodically energised (e.g. 'pulsed') by the electromagnetic control apparatus 16.

Figure 4B:
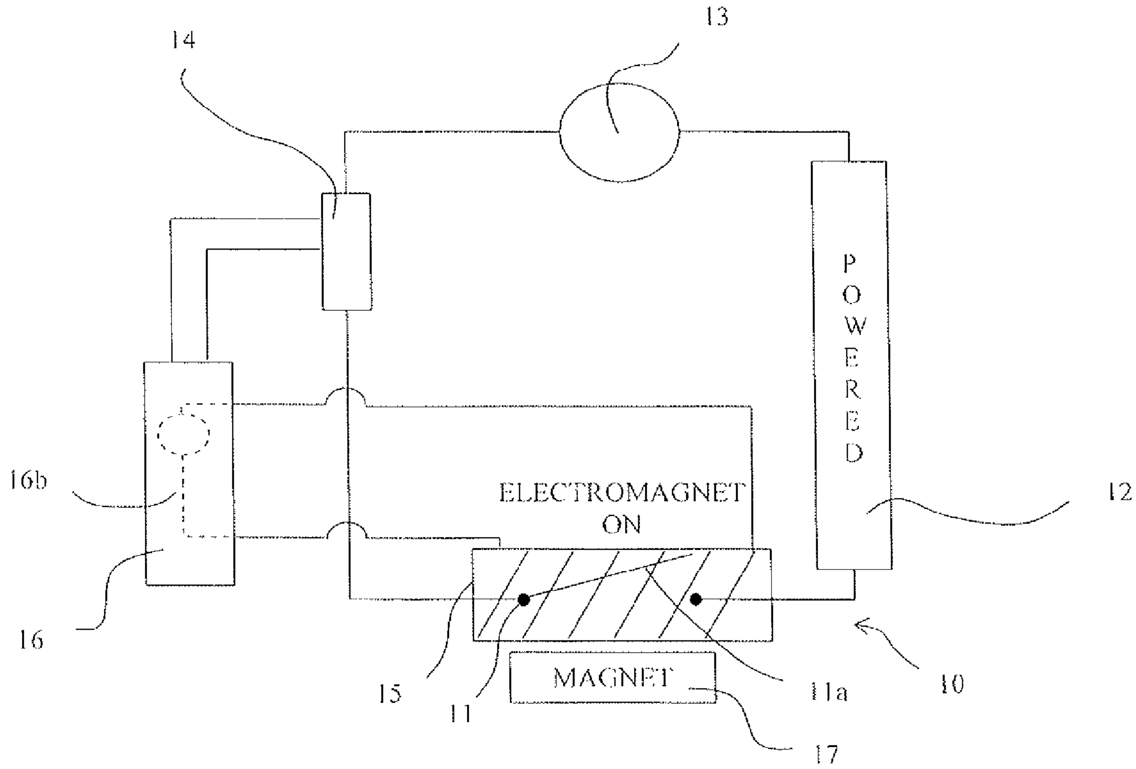

FIG. 4*b* illustrates the situation when the electromagnet 15 has been energised by the electromagnetic control apparatus 16. It can be seen that due to the electromagnet being energised, the magnetic field which the electromagnet 15 establishes works against the magnetic field of the magnet 17 and opens the reed switch 11 (described in more detail below). Since the reed switch 11 has opened due to the electromagnet 15 being energised, this demonstrates that the armature 11*a* of the reed switch 11 has not been welded closed. The monitoring apparatus 14 is able to detect the opening of the reed switch by monitoring electrical characteristics of the circuit (e.g. current flow, potential difference across a load, etc.).

When the electromagnet 15 is energised, if no interruption in the supply of electrical power to the load 12 is detected by the monitoring apparatus 14, then the armature 11*a* of the reed switch 11 has not opened. This means that the armature 11*a* is welded closed. In this case, the safety switch has a fault, and the monitoring apparatus 14 may be used to turn off the power supply 13 (or, for example, open a switch to prevent the power supply 13 supplying electricity to the load 12). The monitoring apparatus may also alert users to the fault by, for example, making a sound or flashing a light, etc. The power supply to the machinery may be turned off to ensure that the safety switch is 'fail-safe', i.e. that when the reed switch 11 of the safety switch welds closed, the machinery is turned off.

The electromagnet 15 is energised (e.g. pulsed) for a very short period of time (e.g. of the order of milliseconds). The electromagnet 15 is pulsed for a sufficient period of time for a break in the supply of power to the load 12 to be detected by the monitoring apparatus 14, but not so long a time as to have any noticeable or significant effect on the supply of electricity to the load 12. Practically speaking then, from the point of view of the load 12, the supply of power is constant even though the reed switch 11 may be temporarily opened. For example, if the load 12 is a motor, the time for which the reed switch 11 is opened may be insufficient to effect the rotation of the motor. Alternatively, the power supply to the load 12 may be controlled by another switch, for example a relay. The electromagnet 15 may be energised for such a period of time that, even if the reed switch 11 is opened, is insufficient to affect the relay (i.e. the time for which there is a break in the circuit to the load 12 is insufficient to switch the relay). Because the relay does not switch, the power which it supplies to, for example, electrical machinery (e.g. a motor) is not affected, i.e. it is constant.

If provided with a relay, the electromagnet 15 may be energised for a time which, even if the reed switch 11 did open, is insufficient to activate or deactivate the relay, preventing the supply of power to the load 12 from being interrupted.

The electromagnet 15 may be energised for a second, less than 10 milliseconds, 2 to 3 milliseconds, or any time period which does not significantly affect the operation of the load 12 should the reed switch 11 open. The electromagnet is may be energised every 10 seconds, every minute, every hour or at any suitable time interval. The duration and frequency of when the electromagnet 15 is energised may coincide with safety standards with which the safety switch must comply.

A complicated situation arises when the electromagnet 15 is energised (i.e. a test to determine whether the reed switch 11 is welded closed is undertaken) at approximately the same time as the door to the machine guard is opened. Although this situation could be avoided by the use of simple interlocks, or appropriate timing of the test of the reed switch 11, it is nevertheless possible that such a situation could arise. FIGS. 5*a* to 5*e* illustrate this situation and how it can be dealt with.

Figure 5A:
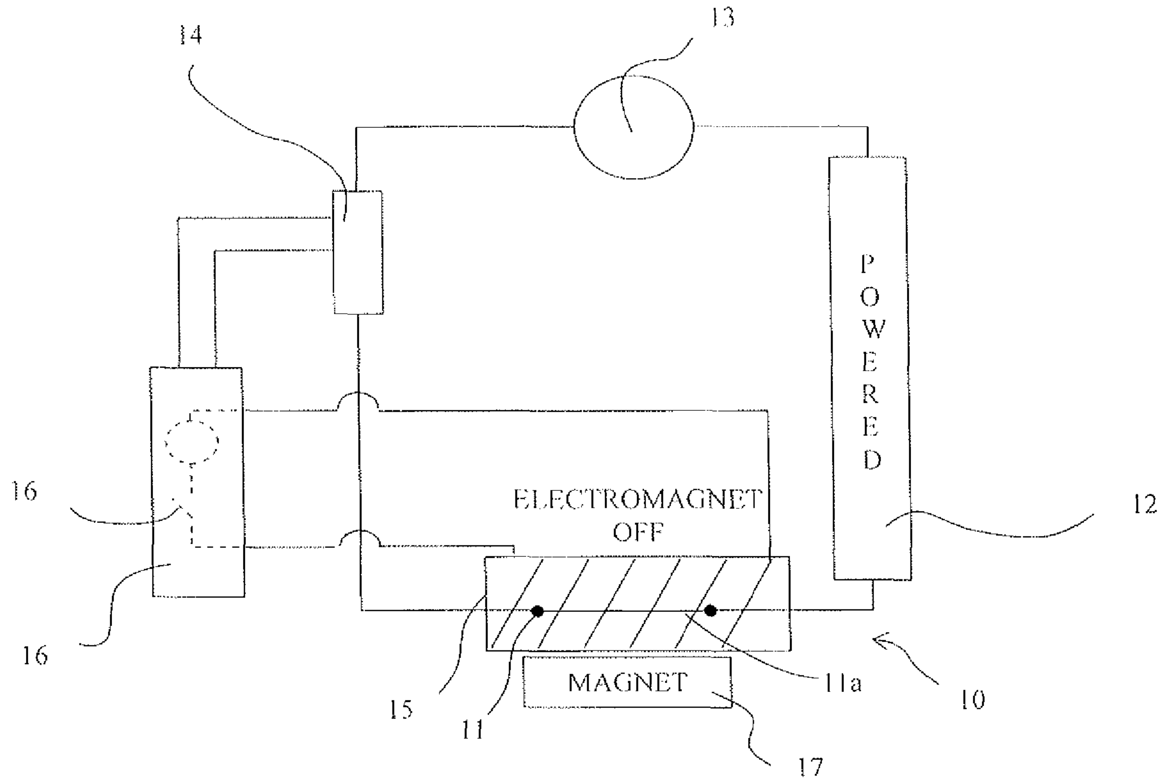
FIGS. 5*a* to 5*e* depict another test.
Figure 5B:
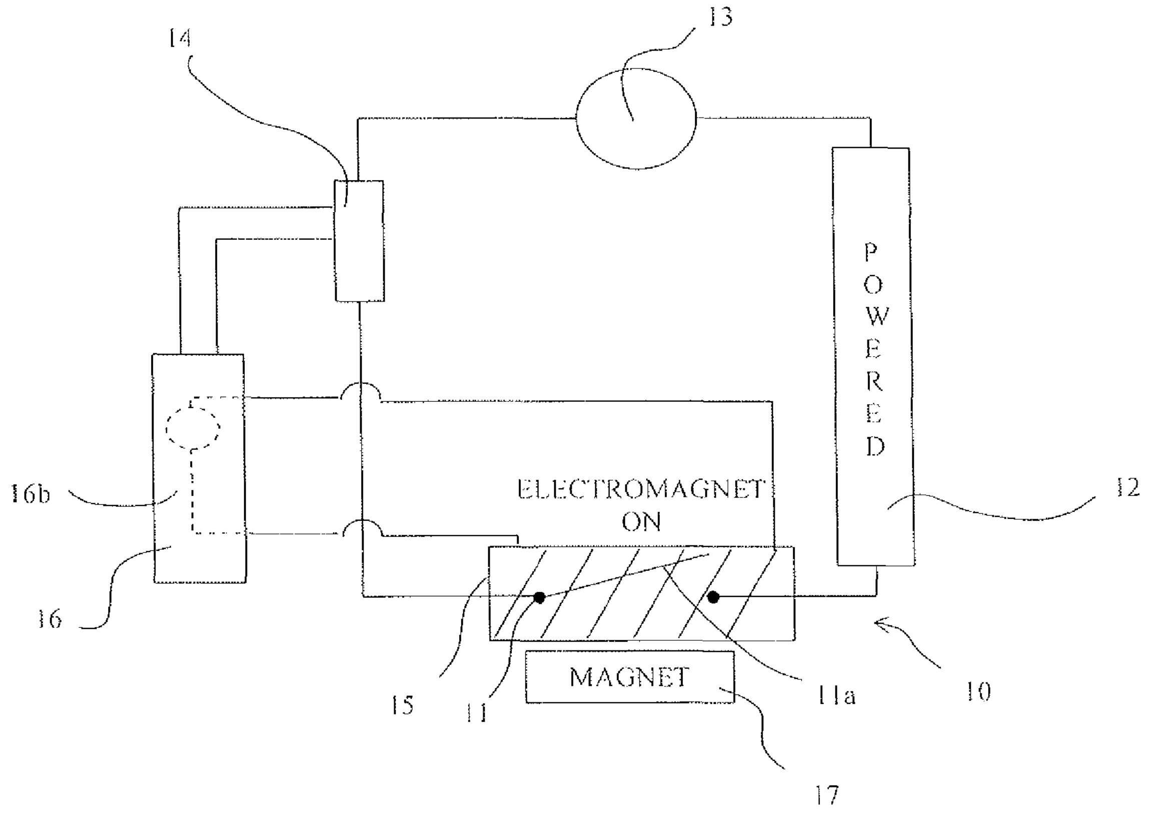
Figure 5C:
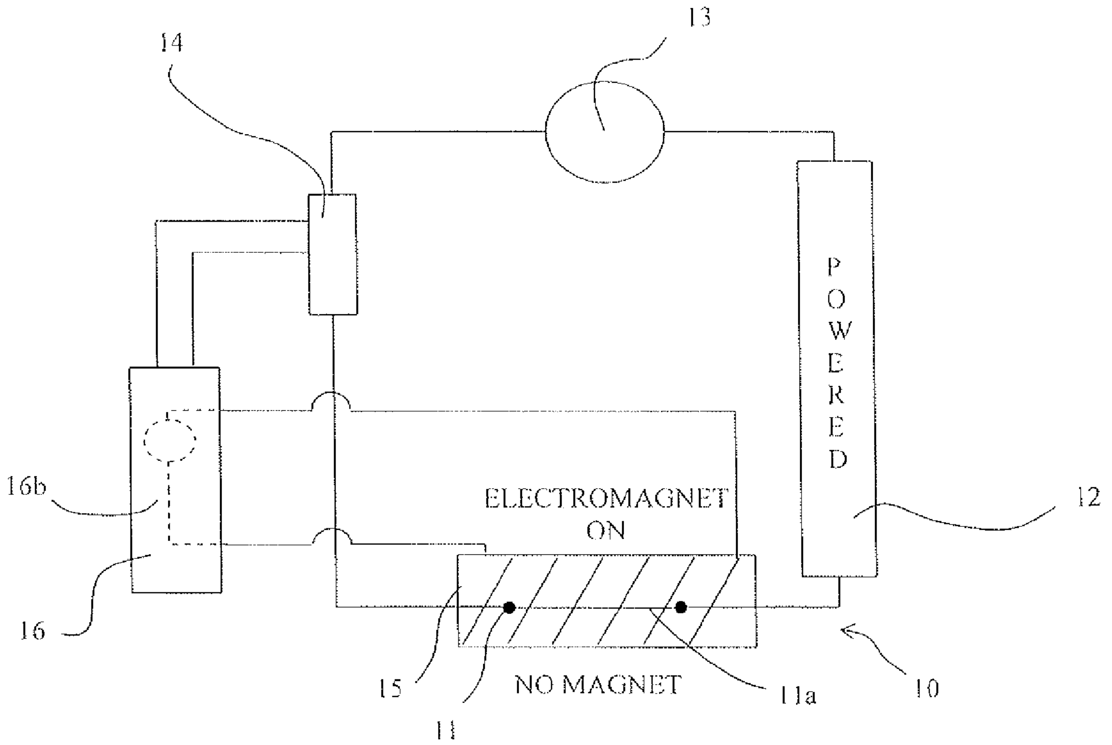

FIG. 5*a* is identical to FIG. 4*a*. It can been seen that the magnet 17 has been brought into close proximity with the reed switch 11, which has caused the reed switch 11 to close thereby allowing electricity to be supplied to the load 12. FIG. 5*b* is identical to FIG. 4*b*, and illustrates the electromagnet 15 being energised to test whether the reed switch 11 has been welded closed. As with FIG. 4*b*, it can be seen from FIG. 5*b* that when the electromagnet 15 is energised, the armature 11*a* is opened, meaning that the armature 11*a* of the reed switch 11 is not welded closed. However, if the door of the machine guard is opened at the same time as the test is being undertaken, the magnet 17 is removed from being in close proximity with the reed switch 11, as illustrated in FIG. 5*c*. Due to the removal of the magnet 17, energising the electromagnet 15 no longer causes the armature 11*a* of the reed switch 11 to be opened, but causes it to close. This is because the magnetic field established by the electromagnet 15 no longer works against the magnetic field of the magnet 17, and therefore closes the reed switch 11.

If the magnet 17 is removed sufficiently quickly, it is possible that the monitoring apparatus 14 will not detect that the reed switch 11 was opened by the electromagnet 15 being energised, and will conclude that the reed switch 11 has been welded closed. As a consequence of this, the monitoring apparatus 14 may interrupt the supply of electricity to the load 12, even though there is nothing wrong with the safety switch (i.e. even though the reed switch 11 is not welded closed).

Figure 5D:
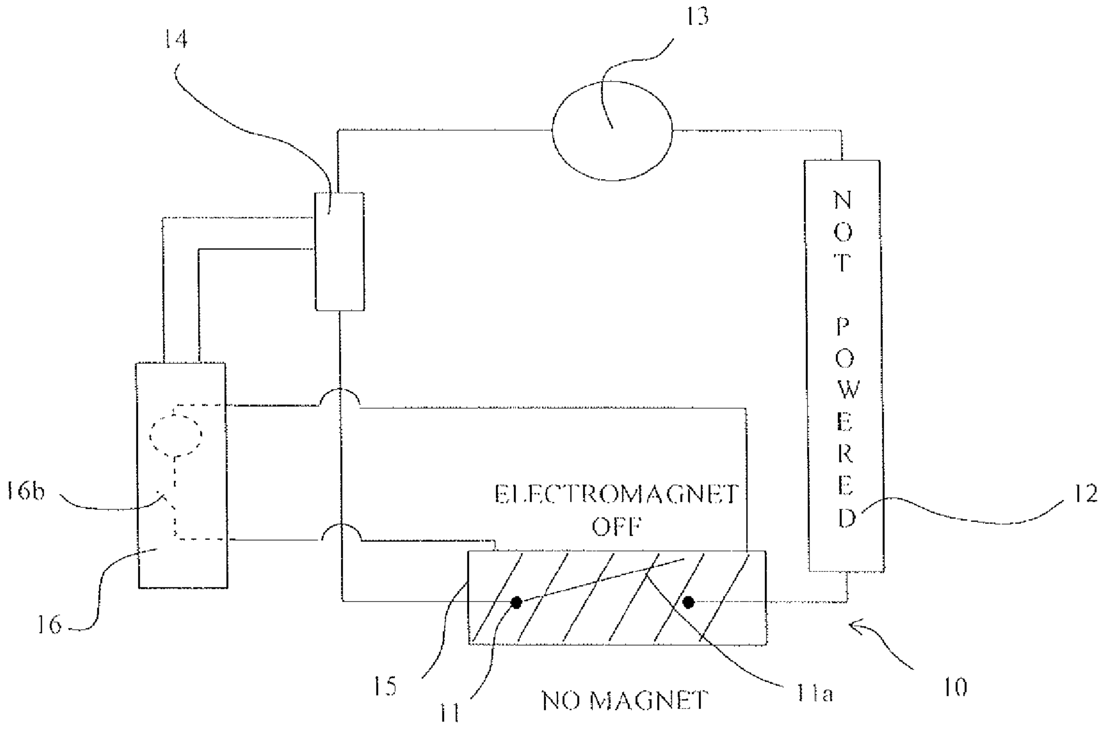
Figure 5E:
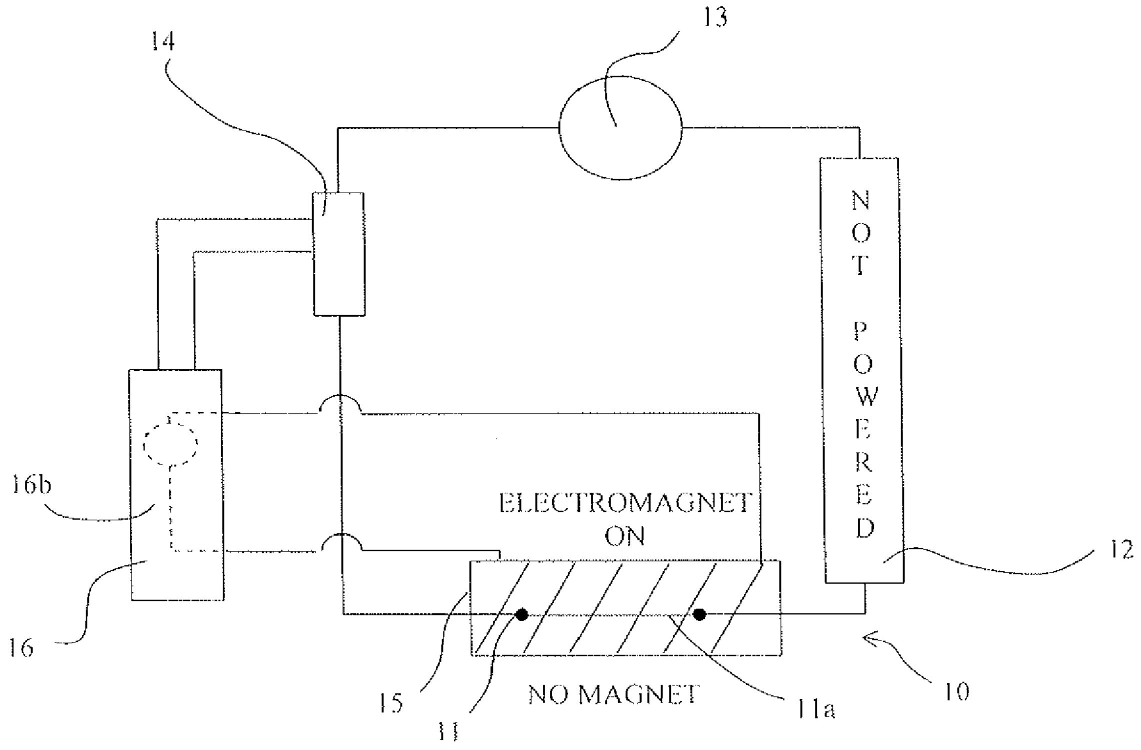

In order to ensure that the supply of electricity to the load 12 is not mistakenly interrupted by the monitoring apparatus 14, another test is undertaken to determine whether the reed switch 11 is welded closed. FIGS. 5*d* and 5*e* illustrate this second (confirmatory) test. The second test is preferably undertaken as soon as possible (e.g. within a second, a few seconds or a few minutes of the first test), and the supply of electricity to the load 12 not interrupted until the second test confirms that the reed switch 11 is welded closed.

FIG. 5*d* illustrates the situation where no magnet is in close proximity to the reed switch 11 (i.e. the door provided with the magnet has been opened). The reed switch 11 is open, thereby preventing electricity being supplied to the load 12. However, from the first test (described above), the monitoring apparatus may have concluded that the reed switch is welded closed, even though it is not (as described above). In order to confirm the state of the reed switch 11, the second test is undertaken, as shown in FIG. 5*e*. The electromagnet 15 is temporarily energised to close the reed switch 11. If the monitoring apparatus 14 detects a change in state of the reed switch (e.g which can be derived from detecting current flow in the circuit 10) this means that the armature 11*a* of the reed switch 11 has moved from an open position to a closed position. This means that the reed switch 11 has not welded closed. The monitoring apparatus 14 does not therefore prevent the supply of electricity to the load 12 until the second test has been undertaken.

On the other hand, if the second test confirms that the reed switch 11 is welded closed, the monitoring apparatus 14 prevents the supply of electricity to the load 12 (for example, by turning off the power supply 13, or by forming a break in the circuit 10 by opening a switch).

By undertaking a plurality of tests, it is possible to determine whether the reed switch 11 has become welded closed, even if the door is opened during the test. If a first test does not provide confirmation of whether or not the reed switch 11 has become welded closed, another test could be undertaken to verify the state of the reed switch 11. Indeed, a plurality of tests in succession may be undertaken in order to confirm that the reed switch 11 has become welded closed before power supplied to the load 12 is interrupted by the monitoring apparatus 14. These tests may be undertaken in quick succession (e.g. within a second of the previous test, within a few seconds, or within few minutes), so that the safety switch is not left in a dangerous state for too long. The tests may be undertaken with any suitable periodicity.

The electromagnet control apparatus 16 may be in communication with the monitoring apparatus 14. Communication between the electromagnet control apparatus 16 and the monitoring apparatus 14 may be used to, for example, automate the testing process.

FIGS. 2 to 5 illustrate a simplified version of the safety switch to illustrate its operation. In practice, the safety switch may be a more complex piece of apparatus including, for example various redundancies. A safety switch incorporating such redundancies is illustrated in FIG. 6.

Figure 6:
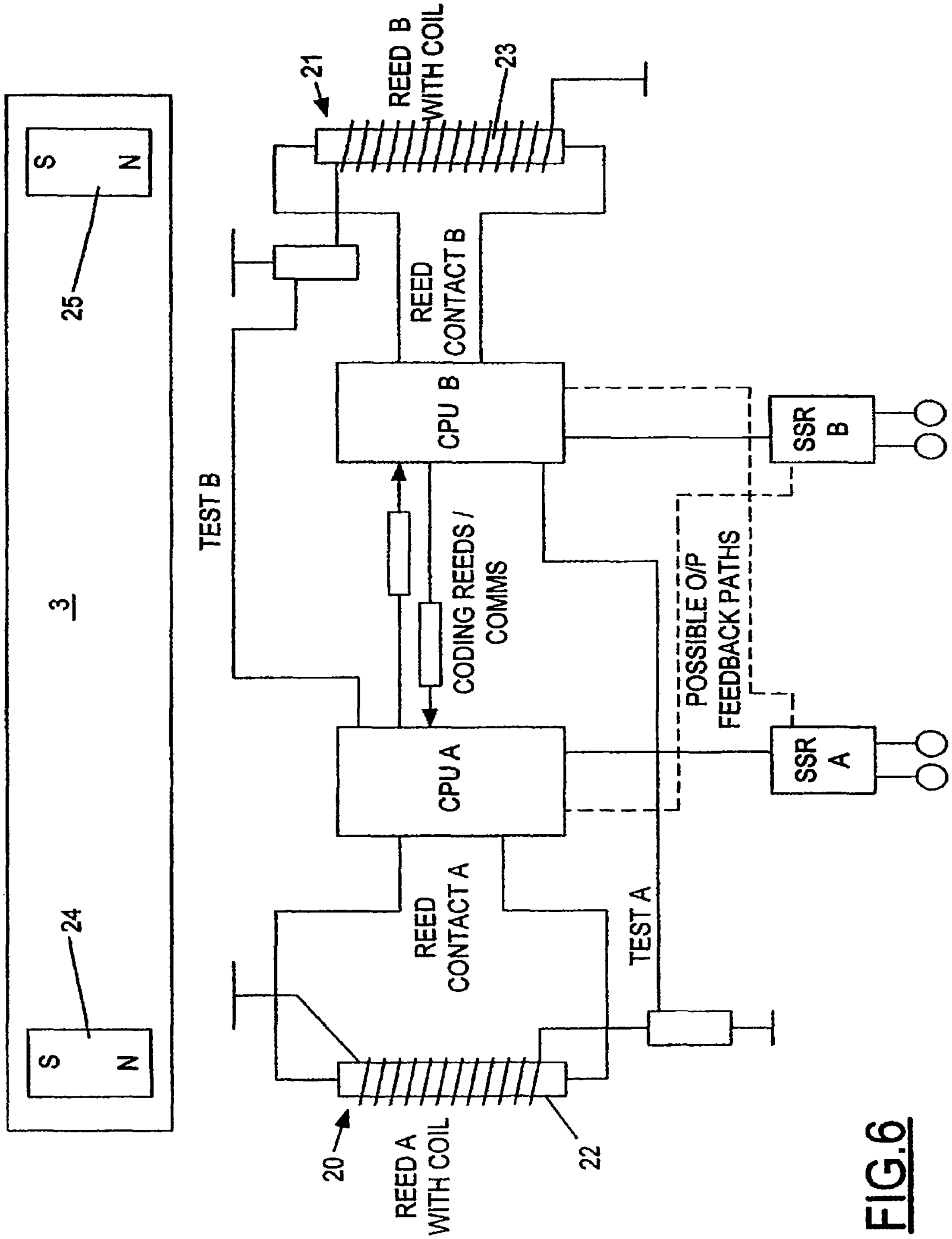
FIG. 6 depicts a safety switch according to another embodiment of the present invention.

FIG. 6 illustrates a safety switch with two reed switches, a first reed switch 20 and a second reed switch 21. As with the reed switch 11 of FIGS. 2 to 5, the reed switches 20, 21 of FIG. 6 are located within electromagnets (i.e. electromagnetic coils). The first reed switch 20 is located within a first electromagnet 22 and the second reed switch 21 is located in a second electromagnet 23. The first reed switch 20 and first electromagnet 22, and the second reed switch 21 and second electromagnet 23 are interconnected to two processors, CPU A and CPU B (which are the equivalent of the monitoring apparatus 14 and electromagnetic control apparatus 16 of FIGS. 2 to 5). CPU A and CPU B energise the first electromagnet 22 and the second electromagnet 23, as well as monitoring the status of the first reed switch 20 and second switch 21. It can be seen from FIG. 6 that both processors CPU A and CPU B are connected to both switches 20, 21, and also to each other. CPU A will energise the second electromagnet 23 to test the second reed switch 21 and communicate with CPU B to instruct it that a test is to be undertaken. CPU B will monitor the state of the second reed switch 21 during the test. Similarly, CPU B will energise the first electromagnet 22 to test the first reed switch 20, and communicate with CPU A to instruct it that a test is to be undertaken. CPU A will monitor the state of the first reed switch 20 during the test. This ensures that the tests are independent, in that one processor performs the test of the switch, whilst the other processor monitors the state of the switch. The communication between the processors may comprise test information, or simply be a high or low input signal (e.g. a simple on or off signal).

The first reed switch 20 and second reed switch 21 are located apart from each other and arranged to interact with magnets located in the door 3 of the machine guard. The door 3 is provided with two magnets, a first magnet 24 and a second magnet 25.

If none of the reed switches 20, 21 have become welded closed, when the door 3 is brought into close proximity with the reed switches 20, 21, the first magnet 24 will cause the first reed switch 20 to close, while the second magnet 25 will cause the second reed switch 21 to close. If both reed switches are closed, processors CPU A and/or CPU B activate the safety switch relays A and B (SSR A, SSR B), allowing power to be supplied to machinery connected to the relays SSR A and SSR B. The first and second reed switches 20, 21 may therefore be referred to as control switches, since they, at least in part, control the supply of electricity to machinery. If one of the reed switches 20, 21 does not close, the processors CPU A and CPU B do not activate the safety switch relays SSR A and SSR B. Thus, if one of the reed switches 20, 21 does not close, the relays SSR A and SSR B are not activated, meaning that electricity is not supplied to machinery within the machine guard. Similarly, if either processor CPU A or CPU B detects that one of the reed switches 20, 21 has been welded closed (as described earlier), the processors CPU A and CPU B do not activate the relays SSR A and SSR B, i.e. no electricity is supplied to machinery within the machine guard.

In providing a plurality of magnets 24, 25 and reed switches 20, 21, the redundancy of the safety switch is improved. If only one of the reed switches 20, 21 fails (i.e. becomes welded closed), no electricity will be supplied to the machinery.

Figure 7A:
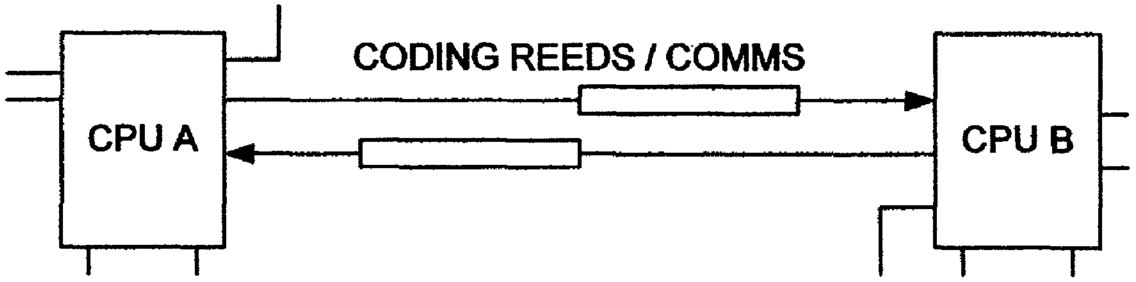
FIGS. 7*a* to 7*c* depict an embodiment of a safety switch according to another embodiment of the present invention.
Figure 7B:
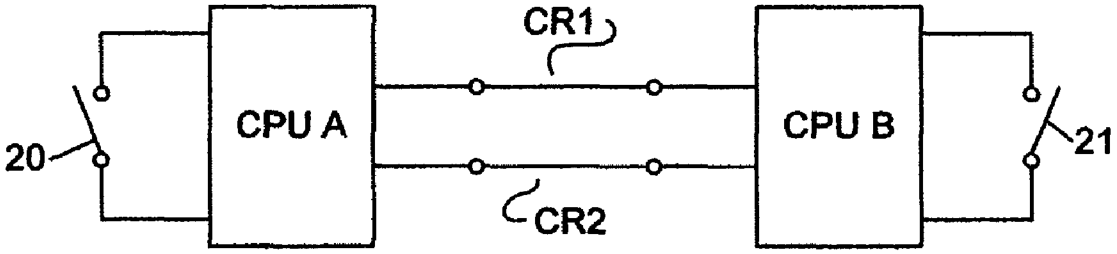
Figure 7C:
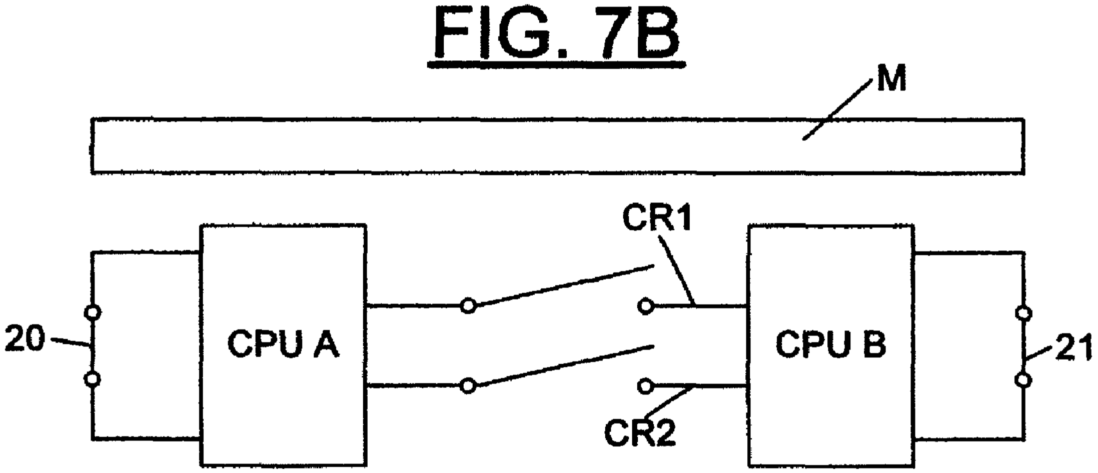

It can be seen from FIG. 6 that if a sufficiently large magnet is placed in the proximity of both reed switches 20 and 21, the safety switch may be over-ridden, concluding that the door to the machine guard has been closed, i.e. the safety switch may conclude that both magnets 24 and 25 are in the correct position and that the door 3 is closed since both reed switches 20, 21 are closed. In this case, the safety switch will allow the supply of electricity to the machinery within the machine guard. This is undesirable, since even if the door to the machine guard is open, the user can use a large magnet to circumvent the safety features of the safety switch, thereby allowing electricity to be supplied to machinery within the machine guard even though the door to the machine guard is open. FIGS. 7*a* to 7*c* illustrate how circumvention of the safety switch by use of a large magnet can be avoided by incorporation of coding reeds disposed between the CPUs.

FIG. 7*a* illustrates a part of the safety switch shown in FIG. 6. The processors CPU A and CPU B are shown, together with two coding reeds disposed between the processors CPU A and CPU B. FIG. 7*b* illustrates FIG. 7*a* in more detail. Shown in FIG. 7*b* are the CPUs, CPU A and CPU B. Communicating lines between CPU A and CPU B are formed by coding reeds CR1 and CR2. The coding reeds CR1, CR2 are biased to a closed position such that, under normal operating conditions, the processors CPU A and CPU B can communicate with one another, e.g. to inform each other that a test of one or both of the reed switches 20, 21 is to be undertaken. The first reed switch 20 and second reed switch 21 are also shown in relation to the processors CPU A and CPU B. The first reed switch 20 and second reed switch 21 are located away from (or are remote from) the coding reeds CR1 and CR2, so that the magnets 24 and 25 do not operate the coding reeds CR1 and CR2 when the magnets 24 and 25 are brought into proximity with the first reed switch 20 and second reed switch 21.

FIG. 7*c* illustrates a situation where a large magnet M has been placed adjacent to the safety switch, and extends across the safety switch from the first reed switch 20, across the coding reeds CR1, CR2 and to the second reed switch 21. It can be seen that the presence of the magnet M has caused the reed switches 20, 21 to close. Ordinarily, this would cause the processors CPU A and CPU B to communicate with each other (possibly to perform a test of the reed switches 20, 21, or to confirm that both reed switches 20, 21 were found to be closed), and allow electricity to be supplied to machinery within the machine guard. In short, the presence of the large magnet M would override the safety switch, making it conclude that two smaller magnets 24, 25 have been placed adjacent to each of the first reed switch 20 and second reed switch 21 (as shown in FIG. 6). However, the presence of the coding reeds CR1 and CR2 on communicating lines between the processors CPU A and CPU B prevents the safety switch from being overridden by the presence of the large magnet M.

When the large magnet M is placed adjacent to the safety switch, not only is the first reed switch 20 and second reed switch 21 closed, but the coding reeds CR1 and CR2 are opened. When one or both of the coding reeds CR1 and CR2 are opened the processors CPU A and CPU B cannot communicate with each other. By default, if the processors CPU A and CPU B cannot communicate with each other, it is assumed that a fault has occurred somewhere in the circuit, and electricity is not allowed to be supplied to the machinery within the machine guard (i.e. the safety switch relays SSR A and SSR B of FIG. 6 are not activated). Therefore, the presence of the coding reeds CR1 and CR2 prevent the safety switch from being overridden by the presence of a large magnet. The coding reeds CR1, CR2 may therefore be considered as override switches.

Although the operation of the safety switch of FIG. 7*a-c* has been described with a magnetic field opening the coding reeds CR1 and CR2, the safety switch could equally be configured such that a magnetic field closes the coding reeds CR1 and CR2. In this different embodiment, closing of the coding reeds may open additional communication paths between the processors CPU A and CPU B along which a signal may flow. If the processors CPU A and CPU B receive this signal, they can prevent electricity being supplied to the machinery. In summary, any suitable configuration is possible, so long as activation of the coding reed or reeds causes the processors to prevent electricity from being supplied to the machinery (or whatever equipment the processors control the supply of electricity to).

It will be appreciated that two coding reeds CR1 and CR2 are not necessary. All that is desired is that a magnetically operated switch in communication with a processor is activated when a large magnet is brought into close proximity with the safety switch. When the magnetically operated switch is activated by the presence of a large magnet, the processor defaults to a situation where the safety switch does not allow electricity to be supplied to the machinery within the machine guard.

In the embodiments of the present invention described above, it has been stated that the electromagnet 15 is energised for a period of time which, if the reed switch 11 was opened, would not significantly effect the operation of the load 12 (i.e. from the point of view of the load 12, the supply of electricity is constant). It is also possible to connect the load indirectly to the circuit 10 incorporating the reed switch 11. For example, a processor (e.g. CPU A or CPU B) or other control apparatus could be connected between the circuit 10 and the load 12 (or the processor could be part of the circuit 10). If the reed switch 11 opens momentarily, the power supply to the processor will be momentarily affected. However, the processor can be configured to maintain a constant power supply to the load, regardless of a momentary opening of the reed switch 11 (e.g. by being connected to another power supply). The processor can be arranged to only cut-off the supply of power to the load 12 if certain conditions are met, i.e. if the reed switch 11 is found to be welded closed or the door to the enclosure is opened.

Using only one reed switch in the circuit of the safety switch may not always be desirable. For example, it is possible that a test to determine if the single reed switch is welded closed is undertaken every few minutes or so. If the reed switch becomes welded closed when the door to the machine guard is closed, and then the door is opened, there will be a period of time when machinery within the machine guard is operating when the door is open. This is undesirable. If two independent reed switches are used, as is shown in FIG. 6, this situation can be avoided. Even if one of the two reed switches are welded closed when the door to the machine guard is opened, the other reed switch will respond to the opening of the door (i.e. by breaking a circuit) and prevent electricity being supplied to the machinery.

If two reed switches are used, when the states of the two reed switches are not the same, processors monitoring the states of the reed switches can prevent electricity being supplied to the machinery. This can be a default, fail-safe response to the states of the reed switches being different. The supply of electricity to the machinery could be cut-off immediately, or after a set time, giving the reed switches time to switch (i.e. in case the reed switches are not actually welded closed). This time delay could be any suitable time, for example two seconds. At the end of the time delay, the states of the reed switches are determined again. If the states are still different, the supply of electricity to the machinery can be cut-off immediately.

In the embodiments of the present invention, a reed switch has been described as the apparatus used to make or break a circuit. However, it is envisioned that any magnetically operated switch may be suitable. For example, a magnetically operated button switch may be used, the position of the button (and therefore the making or breaking of the circuit) being controlled by the application or removal of magnetic fields. It will be appreciated that a reed switch may be located inside the coil of an electromagnet (i.e. a reed relay), or an electromagnet can be located adjacent to the switch.

In the embodiments described above, the monitoring apparatus 14 has been described as a processor (e.g. the processor CPU of FIG. 7*a*). The processor may be part of a computer. In general, the monitoring apparatus 14 may be any suitable apparatus able to monitor the electrical characteristics of the magnetically operated switch or of a circuit of which the magnetically operated switch forms a part.

In the embodiments described above, the electromagnet control apparatus 16 has been described as a power supply which supplies electricity to an electromagnet, the supply being controlled by activation of a switch. Any suitable apparatus may serve as the electromagnet control apparatus 16, for example a signal generator or processor.

All of the above embodiments have described an electromagnet 15 surrounding a reed switch 11 however other configurations are envisioned. The electromagnet 15 may be placed in any suitable location relative to the reed switch 11, so long as the magnetic field which the electromagnet 15 establishes when energised is sufficient to be able to move the armature 11*a* of the reed switch 11. For example, the electromagnet 15 may be located adjacent to the reed switch 11.

In the embodiments described above, for simplicity, the polarity of the magnets has not been described. If the magnetic field of the magnet 17 or electromagnet 15 is of sufficient strength, the polarity of the magnetic field is inconsequential—the armature 11*a* will be attracted to the greatest magnetic field. However, in some circumstances the polarity of the magnet should be considered.

If the electromagnet 15 is energised to close the reed switch 11, the magnetic field generated will have a certain polarity depending on the direction of flow of current in the electromagnet. A permanent magnet (e.g. the magnet 17 in the door of the machine guard) will also have a specific polarity. If the magnetic field of the magnet 17 is comparable in strength to the magnetic field of the electromagnet 16, and the magnet 17 (and therefore its polarity) are oriented in a specific way, then the magnetic field of the magnet 17 and the magnetic field of the electromagnet 16 can be made to work with or against each other. If the polarities are aligned such that the 'North' of one magnetic field is opposite the 'South' of the other, the fields work with each other to close the reed switch. If the polarities are opposed such that the 'North' of one magnetic field is opposite the 'North' of the other, the fields work against each other, and it may be possible to open the reed switch.

The polarities of the magnetic fields can therefore have practical implications. For example, in the above embodiments, when no permanent magnet 17 is in close proximity to the reed switch 11, energising the electromagnet 15 will cause the reed switch 11 to close. Only one field is present, and this field acts on the armature 11*a* of the reed switch 11 to close it. However, when the magnet 17 is in close proximity to the reed switch 11, the polarity and magnitude of the magnetic field established by the electromagnet can be manipulated to act against the field of the magnet 17 to open the reed switch 11.

In variations on the above embodiments, it may be preferable to choose magnets or establish magnetic fields of particular strengths and polarities for different applications. The testing principles described above are equally applicable to all such variations.

In the embodiments described above, bringing a magnet (e.g. the magnet 17 of FIG. 5) into close proximity with the reed switch 11 has caused the reed switch 11 to close. The electromagnet 15 is energised to open the reed switch 11. It will be appreciated that, in some circumstances, the reverse logic may be suitable, i.e. bringing a magnet (e.g. the magnet 17 of FIG. 5) into close proximity with the reed switch 11 causes the reed switch 11 to open, with the electromagnet 15 being energised to close the reed switch 11. Generally speaking, the electromagnet 15 being energised establishes a magnetic field which is arranged to move the reed switch 11 from a first configuration to a second configuration. The first configuration can be when the reed switch is open, and the second configuration when the reed switch is closed. Alternatively, the first configuration can be when the reed switch is closed, and the second configuration when the reed switch is open.

It will be appreciated that the above embodiments of the invention have been described by way of example only, and that various modifications may be made to these embodiments without detracting from the invention, which is defined by the claims that follow.

What is claimed is:

1. A method of determining whether a magnetically operated switch of a safety switch has been welded closed, the method comprising:

establishing a first magnetic field proximate the magnetically operated switch, the magnetic field being arranged to move the magnetically operated switch from a first configuration to a second configuration; and monitoring a state of the magnetically operated switch to determine if the magnetically operated switch has been moved by the first magnetic field, thereby determining if the magnetically operated switch has been welded closed; and wherein the magnetically operated switch is opened by the first magnetic field for a period of time selected to interrupt an electric circuit supplying electricity to an electrically powered apparatus without interrupting operation of the electrically powered apparatus.

2. The method as claimed in claim 1, wherein the first configuration is defined by the magnetically operated switch being closed, and the second configuration is defined by the magnetically operated switch being open.

3. The method as claimed in claim 1, further comprising preventing the safety switch from supplying electricity to an electrically operated apparatus if the magnetically operated switch is determined to be welded closed.

4. The method as claimed in claim 1, wherein monitoring the state of the magnetically operated switch includes monitoring at least one electrical characteristic of a circuit that includes the magnetically operated switch.

5. The method as claimed in claim 4, wherein the at least one electrical characteristic is one of a current flowing through the circuit and a potential difference across a component in the circuit.

6. The method as claimed in claim 1, wherein the first magnetic field is established for a duration of one of less than one second and less than ten milliseconds.

7. The method as claimed in claim 1, wherein the first magnetic field is established by energizing an electromagnet.

8. The method as claimed in claim 1, wherein the method is repeated periodically.

9. The method as claimed in claim 1, wherein the method is repeated to verify a state of the magnetically operated switch.

10. The method as claimed in claim 1 further comprising establishing a second magnetic field proximate the magnetically operated switch to close the magnetically operated switch, before establishing the first magnetic field arranged to open the magnetically operated switch.

11. The method as claimed in claim 10 further comprising attaching one of the magnetically operated switch and a magnet to an enclosure and attaching another of the magnetically operated switch and the magnet to a door of the enclosure such that the magnet interacts with the magnetically operated switch by closing the door of the enclosure.

12. The method as claimed in claim 1 wherein the magnetically operated switch is a reed switch.

13. A safety switch arranged to control a supply of electricity to an electrically powered apparatus, the safety switch comprising:

a magnetically operated switch;

an electromagnet located adjacent the magnetically operated switch and energisable to establish a magnetic field to move the magnetically operated switch from a first configuration to a second configuration;

an electromagnet control apparatus arranged to energize the electromagnet and to energize the electromagnet for a period of time which, if the magnetically operated switch is opened by the magnetic field, to break an electric circuit supplying electricity to the electrically powered apparatus, the period of time is insufficient to affect operation of the electrically operated apparatus; and a monitoring apparatus configured to monitor a state of the magnetically operated switch and determine whether the magnetically operated switch moves in response to energisation of the electromagnet.

14. The safety switch as claimed in claim 13, wherein the first configuration is defined by the magnetically operated switch being closed, and the second configuration is defined by the magnetically operated switch being open.

15. The safety switch as claimed in claim 14, wherein the monitoring apparatus is arranged to prevent electricity being supplied to the electrically powered apparatus if the magnetically operated switch does not open in response to the electromagnet being energized.

16. The safety switch as claimed in claim 13, wherein the electromagnet control apparatus is arranged to energize the electromagnet for a duration of one of less than one second and for less than ten milliseconds.

17. The safety switch as claimed in claim 13, wherein the electromagnet control apparatus is configured to energize the electromagnet periodically.

18. The safety switch as claimed in claim 13, wherein the monitoring apparatus is a processor.

19. The safety switch as claimed in claim 13, wherein the magnetically operated switch is a reed switch.

20. A safety switch arranged to allow control of a supply of electricity to an electrically powered apparatus, the safety switch comprising:

a magnetically operated control switch;

a monitoring apparatus in electrical communication with the magnetically operated control switch and configured to monitor a state of the magnetically operated control switch, the monitoring apparatus being arranged to control the supply of electrical power to the electrically powered apparatus depending on the state of the magnetically operated control switch; and a magnetically operated override switch in electrical communication with the monitoring apparatus, the monitoring apparatus being configured to prevent the supply of electricity to the electrically powered apparatus if the magnetically operated override switch is operated, regardless of the state of the magnetically operated control switch.

21. The safety switch as claimed in claim 20, further comprising another monitoring apparatus such that the safety switch includes a pair of monitoring apparatus, the magnetically operated override switch being connected between the pair of monitoring apparatus such that communication between the pair of monitoring apparatus is controlled by operation of the magnetically operated override switch.

22. The safety switch as claimed in claim 21, wherein at least one of the pair of monitoring apparatus are configured to prevent the supply of electricity to the electrically powered apparatus if the magnetically operated override switch is operated.

23. The safety switch as claimed in claim 21, further comprising another magnetically operated override switch such that the safety switch includes a pair of magnetically operated override switches, the another magnetically operated override switch being connected between the pair of monitoring apparatus, wherein operation of one of the pair of magnetically operated override switches controls communication between the pair of monitoring apparatus.

24. The safety switch as claimed in claim 23, wherein at least one of the pair of monitoring apparatus are configured to prevent the supply of electricity to the electrically powered apparatus if at least one of the pair of magnetically operated override switches is operated.

25. The safety switch as claimed in claim 20, wherein the monitoring apparatus is configured to allow the supply of electricity to the electrically powered apparatus only if the magnetically operated control switch is closed.

26. The safety switch as claimed in claim 20, wherein the monitoring apparatus is a processor.

27. The safety switch as claimed in claim 20, wherein at least one of the magnetically operated control switch and the magnetically operated override switch is a reed switch.

* * * * *